(12) United States Patent
Jang et al.

(10) Patent No.: US 8,009,066 B2
(45) Date of Patent: Aug. 30, 2011

(54) METHOD AND APPARATUS FOR CODING AND DECODING USING BIT-PRECISION

(75) Inventors: Euee-Seon Jang, Seoul (KR);
Sun-Young Lee, Seoul (KR); Gi-Seok Son, Seoul (KR); Chung-Ku Lee, Incheon (KR)

(73) Assignee: Humax Co., Ltd., Seongnam-Si (KR)

( * ) Notice: Subject to any disclaimer, the term of this patent is extended or adjusted under 35 U.S.C. 154(b) by 0 days.

(21) Appl. No.: 12/694,242

(22) Filed: Jan. 26, 2010

(65) Prior Publication Data

US 2010/0123608 A1 May 20, 2010

Related U.S. Application Data

(63) Continuation of application No. 12/669,770, filed as application No. PCT/KR2008/004232 on Jul. 18, 2008.

(30) Foreign Application Priority Data

| Jul. 18, 2007 | (KR) | ......................... 10-2007-0071779 |
| Feb. 20, 2008 | (KR) | ......................... 10-2008-0015213 |
| Mar. 17, 2008 | (KR) | ......................... 10-2008-0024643 |
| Apr. 23, 2008 | (KR) | ......................... 10-2008-0037856 |

(51) Int. Cl.
*H03M 7/34* (2006.01)
(52) U.S. Cl. .......................................... 341/51; 375/240
(58) Field of Classification Search .............. 341/50–90; 375/240.12, 240, E7.243, 295, E7.246, 316, 375/260, 210
See application file for complete search history.

(56) References Cited

U.S. PATENT DOCUMENTS

| 5,963,673 | A | * | 10/1999 | Kodama et al. ................ 382/239 |
| 6,137,839 | A | * | 10/2000 | Mannering et al. ........... 375/260 |
| 6,950,466 | B2 | * | 9/2005 | Kim et al. ................. 375/240.12 |
| 2006/0291565 | A1 | | 12/2006 | Chen |

* cited by examiner

*Primary Examiner* — Lam T Mai
(74) *Attorney, Agent, or Firm* — Birch, Stewart, Kolasch & Birch, LLP

(57) ABSTRACT

Discussed are a method and an apparatus of encoding/decoding by using a bit precision. In accordance to an aspect of the present invention, it is possible to encoding and decoding an image or a video by using a bit precision. Accordingly, compression efficiency can be improved and the decoding complexity can be reduced by encoding/decoding video data by use of the bit precision.

15 Claims, 4 Drawing Sheets

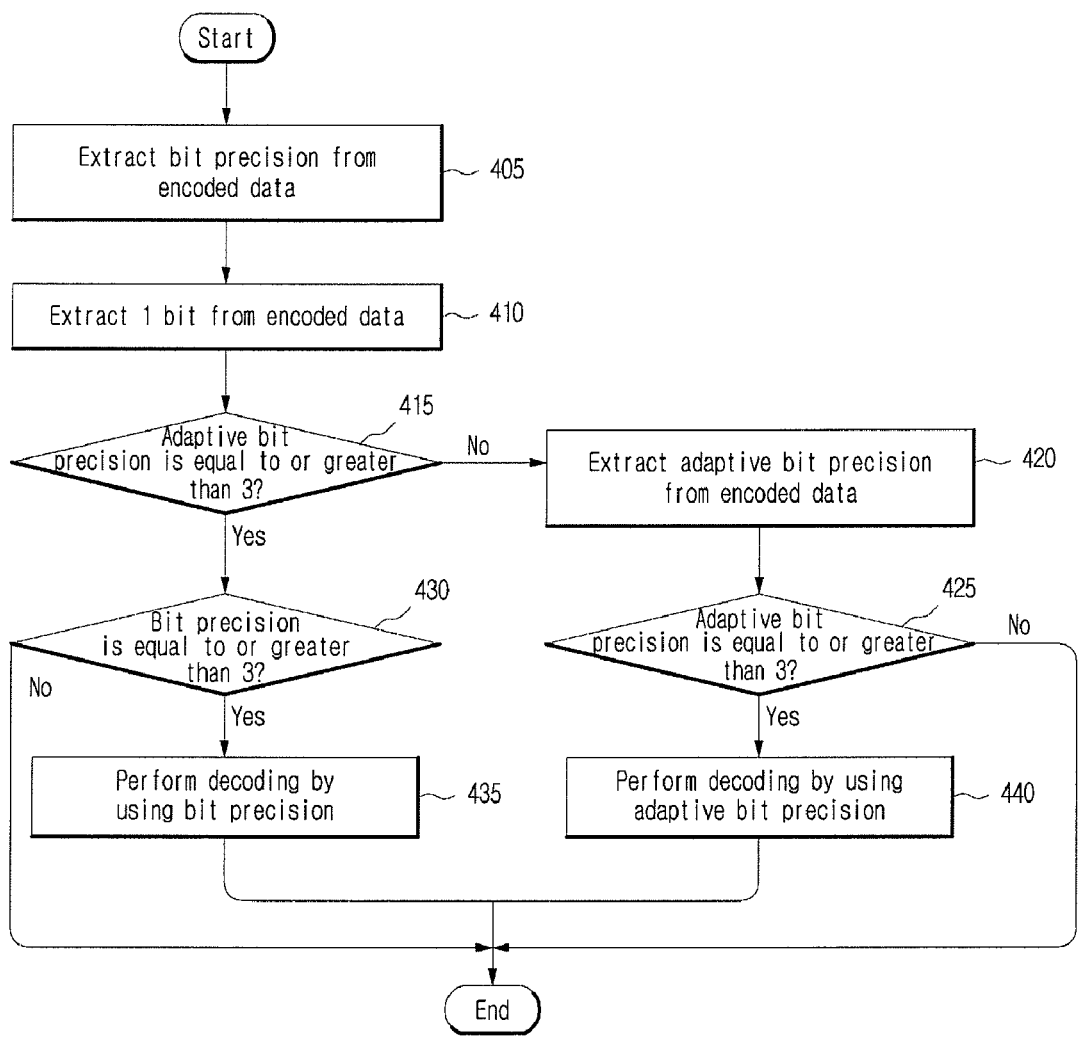

METHOD AND APPARATUS FOR CODING AND DECODING USING BIT-PRECISION

This application is a Continuation of co-pending U.S. application Ser. No. 12/669,770 filed on Jan. 19, 2010, which is a National Phase of PCT/KR2008/004232 filed on Jul. 18, 2008, which claims priority under 35 U.S.C. 119(a) to Korean Patent Application No. 10-2007-0071779, 10-2008-0024643, 10-2008-0037856, and 10-2008-0015213 filed in Korea on Jul. 18, 2007, Mar. 17, 2008, Apr. 23, 2008 and Feb. 20, 2008, respectively. Each of these applications are hereby expressly incorporated by reference into the present application.

TECHNICAL FIELD

The present invention relates to an apparatus for coding and decoding (hereinafter, referred to as coding/decoding), more specifically to a coding/decoding method and apparatus for improving compression efficiency of video data.

BACKGROUND ART

With the increase of data transmission capacity per second through the Internet, there has been an increased amount of multimedia data, including video and picture files, over the past, when simple text data had been mostly transmitted. Accordingly, there has been an increased demand for video compression technologies.

A video is compressed by undergoing an entropy coding, which transforms a bit string indicating a symbol of data to another form. The entropy coding is classified into a Huffman coding and an arithmetic coding. In particular, the Huffman coding is popularly used in many video compression codecs because of its efficient compression and proper decoding complexity. In spite of having high decoding complexity, the arithmetic coding has relatively high compression efficiency. Accordingly, the arithmetic coding is used in the fields which require the high compression efficiency.

The recent advent of low-performance mobile media apparatuses, which runs in limited power, requires an entropy coding method that has less complex decoding. Nevertheless, there have been far less studies on how to make the decoding less complex than how to improve the video compression efficiency.

An entropy coding method using a bit precision has been recently suggested to lower the decoding complexity. However, the entropy coding method has low compression efficiency because of additionally inserting one bit precision into a bitstream per VOP or macroblock.

DISCLOSURE

Technical Problem

Accordingly, the present invention provides a coding/decoding method and apparatus using a bit precision that can improve compression efficiency by selecting an adequate predictor without a generated additional bit.

The present invention also provides a coding/decoding method and apparatus using a bit precision that can lower a decoding complexity and shorten a decoding time by using the bit precision.

The present invention provides a coding/decoding method and apparatus using a bit precision that can encode/decode video data by using an prediction bit precision computed based on an adjacent macroblock, to thereby improve compression efficiency.

The present invention provides a coding/decoding method and apparatus using a bit precision that can encode/decode video data by using a bit precision corresponding to symbols of an adjacent macroblock, to thereby improve compression efficiency and lower decoding complexity.

The present invention provides a coding/decoding method and apparatus using a bit precision that can encode/decode video data by using a bit precision selected by a plurality of methods, to thereby improve compression efficiency.

In addition, the present invention provides a coding/decoding method and apparatus using a bit precision that can encode/decode video data by differently computing a bit precision per each field, to thereby improve compression efficiency.

Technical Solution

An aspect of the present invention features an apparatus capable of encoding video data by using a bit precision.

In accordance with an embodiment of the present invention, an encoding apparatus using a bit precision can include an adaptive bit precision computing unit, configured to compute an adaptive bit precision and an adaptive bit string of a symbol; and an encoding unit, configured to compute a bit precision per field and to insert the adaptive bit string and any one of the bit precision and the adaptive bit precision, according to whether the bit precision is identical to the adaptive bit precision, into a bitstream. Here, the encoding unit can further inserts a bit indicating whether the adaptive bit precision is identical to the adaptive bit string into the bitstream.

Another aspect of the present invention features an apparatus capable of decoding video data by using a bit precision.

In accordance with an embodiment of the present invention, a decoding apparatus using an adaptive bit precision can include an adaptive bit precision extracting unit, configured to extract at least one of an adaptive bit precision and an adaptive bit string from a bitstream; and a decoding unit, configured to extract a bit precision from the bitstream and to decode the adaptive bit string as a symbol by using any one of the bit precision and the adaptive bit precision according to whether the bit precision is identical to the adaptive bit precision. Here, the adaptive bit precision extracting unit can determine whether to extract the adaptive bit precision according to whether the bit precision is identical to the adaptive bit precision.

Advantageous Effects

The present invention can select an adequate predictor without a generated additional bit to improve compression efficiency by providing a coding/decoding method and device using a bit precision The present invention can also lower a decoding complexity and shorten a decoding time by using the bit precision.

The present invention can encode/decode video data by using a prediction bit precision computed based on an adjacent macroblock, to thereby improve compression efficiency.

The present invention can encode/decode video data by using a bit precision corresponding to symbols of an adjacent macroblock, to thereby improve compression efficiency and lower decoding complexity.

The present invention can encode/decode video data by using a bit precision selected by a plurality of methods, to thereby improve compression efficiency.

In addition, the present invention can encode/decode video data by differently computing a bit precision per each field, to thereby improve compression efficiency.

DESCRIPTION OF DRAWINGS

FIG. 4 is a flow chart showing a decoding operation using an adaptive bit precision in accordance with an embodiment of the present invention.

MODE FOR INVENTION

Figure 1:
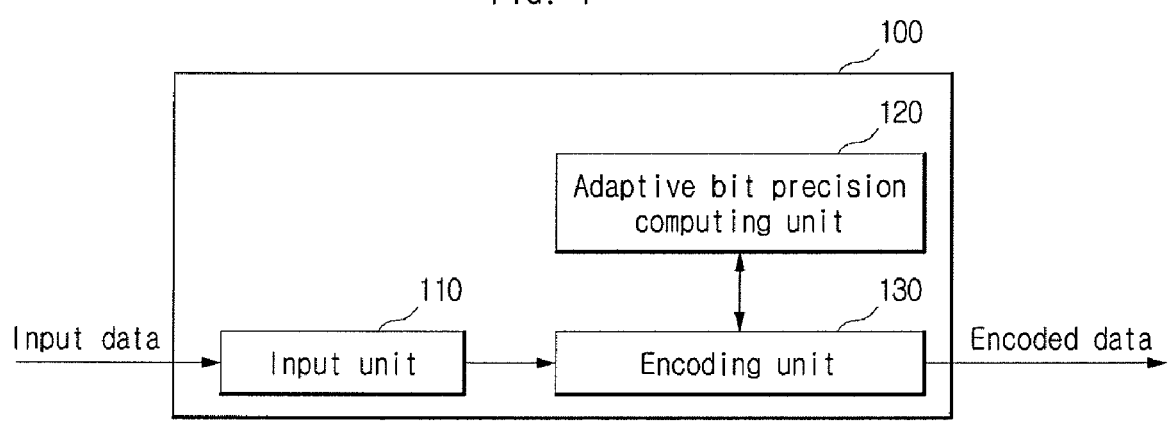
FIG. 1 is a block diagram showing an encoding apparatus using an adaptive bit precision in accordance with an embodiment.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments of the present invention will be described in detail with reference to the accompanying drawings.

For the convenience of understanding and description, the conception of the encoding method using a bit-precision in accordance with an embodiment of the present invention will be firstly described as follows.

The encoding method in accordance with an embodiment of the present invention determines a bit precision for each symbol of input data. Here, the symbol refers to a word unit, which forms the input data. The bit precision indicates a length of a unit bitstream for encoding each symbol by using a bit or a binary code. For example, if the bit precision is n, an inputted symbol is represented and encoded in the binary code by using the unit bitstreams in the quantities of n.

It is assumed that the inputted symbols are {2, 1, 0, 4, 5 3} and the bit-precision value is 2. Values 0 through 3 can be represented by using two bits. If the symbol value is larger than 3, it is impossible to represent the symbol value by using 2 bits. Accordingly, the symbol value that is larger than 3 is represented by additionally assigning two bits.

In particular, the symbol values "2", "1", and '0' are binarized as "10," "01" and "00." However, since the symbol value "4" is larger than "3" that is the maximum value capable of being represented by using 2 bits, it is impossible that the symbol value "4" is represented by using 2 bits only.

Accordingly, the symbol value "4" is represented by allowing the "3" that is the maximum value capable of being represented by using 2 bits to be represented as "11" and the remainder, "1." to be represented as "01" by using another 2 bits. As a result, the symbol "4" is represented as "1101" by adding another 2 bits to the first 2 bits. Similarly, the symbol value "5" is represented as "1110" by using the maximum value "3" with 2 bits and the remainder "2" with another 2 bits. Even though it is possible that the symbol value "3" is represented by the 2 bits only, the symbol value "3" is represented by additionally using another 2 bits for the remainder "0" as "1100" in order to distinguish what is represented for 3 and more from what is represented for 3.

If the aforementioned coding method using a bit-precision is applied to the symbol values of data of 0 through 9, the symbol values can be represented as shown in the following table 1.

TABLE 1

|   | Bit-precision Value 1 Bit | Bit-precision Value 2 Bit | Bit-precision Value 3 Bit | Bit-precision Value 4 Bit | Bit-precision Value 5 Bit |
| --- | --- | --- | --- | --- | --- |
| 0 | 0 | 00 | 000 | 0000 | 00000 |
| 1 | 01 | 01 | 001 | 0001 | 00001 |
| 2 | 001 | 10 | 010 | 0010 | 00010 |
| 3 | 0001 | 1100 | 011 | 0011 | 00011 |
| 4 | 00001 | 1101 | 100 | 0100 | 00100 |
| 5 | 000001 | 1110 | 101 | 0101 | 00101 |
| 6 | 0000001 | 111100 | 110 | 0110 | 00110 |
| 7 | 00000001 | 111101 | 111000 | 0111 | 00111 |
| 8 | 000000001 | 111110 | 111001 | 1000 | 01000 |
| 9 | 0000000001 | 11111100 | 111010 | 1001 | 01001 |

As shown in the table 1, encoding strings of symbols corresponding to bit precision values are different from each other. Accordingly, it is required to determine which bit precision of various types of bit precisions is used to encode input data before the encoding operation is performed. An encoding compression rate of the input data is also varied depending on the determined bit precision. The symbols to be encoded are encoded by using all bit precisions. Then, the bit precision having the best compression rate is finally selected for the bit precision to be encoded.

For example, if it is assumed that the encoding is performed by using the bit precision values, 1 through 3, all symbols of a certain macroblock is encoded by using the bit precision values, 1 through 3. At this time, if the macroblocks encoded by using the bit precisions, 1, 2 and 3 have the capacities of 3, 2 and 1 Mbyte, respectively, the bit precision 3 is finally selected as the bit precision of the pertinent macroblock.

In accordance with an embodiment of the present invention, an additional bit precision (hereinafter, referred to as an "adaptive bit precision") can be computed corresponding to each symbol in addition to the bit precision. Here, the adaptive bit precision refers to the length of a unit bit string for encoding each symbol. Hereinafter, the adaptive bit precision will be briefly described for the convenience of understanding and description.

Each symbol can be represented in the adaptive bit precision and an adaptive bit string before being inserted into the bitstream. The below table 2 shows the adaptive bit precision and the adaptive bit string of each symbol.

TABLE 2

| Symbol | Adaptive bit precision | Adaptive bit string |
|--------|------------------------|---------------------|
| 0 | 0 | — |
| 1 | 1 | — |
| 2 | 2 | — |
| 3 | 3 | 00 |
| 4 | 3 | 01 |
| 5 | 3 | 10 |
| 6 | 3 | 11 |
| 7 | 4 | 000 |
| 8 | 4 | 001 |

The length of each adaptive bit string is determined as a value obtained by subtracting "1" from the adaptive bit precision. For example, if the adaptive bit precision is "3," the length of the pertinent adaptive bit string as "2" (i.e. 2 bits). At this time, if the adaptive bit precision has the values of 0 through 2, the symbol is represented in the adaptive bit precision only without the adaptive bit string. Since the length of each adaptive bit string is a value obtained by subtracting "1" from the adaptive bit precision, the adaptive bit strings can represent the symbols in the quantities of the $n^{th}$ power of 2. Here, n is obtained by subtracting "1" from the adaptive bit precision. For example, the adaptive bit precision, 3, can represent 4 symbols, and the adaptive bit precision, 4, can represent 8 symbols. In the case of the adaptive bit precision, 3, as shown in the table 2, "00," "01," "10" and "11" correspond to 3, 4, 5 and 6, respectively. In the case of the adaptive bit precision, 4, "000," "001," "010," "011," "100," "101," "110" and "111" correspond to 7, 8, 9, 10, 11, 12, 13 and 14, respectively. The aforementioned adaptive bit precision and adaptive bit string are inserted to a bitstream before being transmitted to a decoder. At this time, the adaptive bit precision can be inserted to the bitstream by undergoing an additional process. This will be described in detail below with reference to the related drawings.

FIG. 1 is a block diagram showing an encoding apparatus using an adaptive bit precision in accordance with an embodiment.

Referring to FIG. 1, the encoding apparatus 100 include an input unit 110, an adaptive bit precision computing unit 120 and an encoding unit 130.

The input unit 110 receives input data from an outside device and extracts a symbol to be encoded. The input unit 110 outputs the extracted symbol to the encoding unit 130. At this time, the input data can include at least one of a pixel value, mcbpc, cbpy, mv (motion vector)-x, mv-y, DCT-luma and DCT-chroma. The mcbpc, cbpy, mv (motion vector)-x, mv-y, DCT-luma and DCT-chroma are used in the encoding/ decoding operation according to the MPEG standard. This shall be evident to any person of ordinary skill in the art. Accordingly, the detailed pertinent description will be omitted.

The adaptive bit precision computing unit 120 receives a signal requesting an adaptive bit precision and an adaptive bit string of a certain symbol from the encoding unit 130. The adaptive bit precision computing unit 120 computes the adaptive bit precision and the adaptive bit string of the symbol according to the requesting signal to output them to the encoding unit 130. Since the method of computing the adaptive bit precision and the adaptive bit string has been described by using the table 2, the pertinent detailed description will be omitted. Alternatively, the adaptive bit precision computing unit 120 can store a pre-computed adaptive bit precision and adaptive bit string instead of computing the adaptive bit precision and the adaptive bit string of the symbol according to the request of the encoding unit 130. In other words, if the adaptive bit precision computing unit 120 receives the signal requesting the adaptive bit precision and the adaptive bit string of the certain symbol from the encoding unit 130, the adaptive bit precision computing unit 120 can output the adaptive bit precision and the adaptive bit string of the pertinent symbol among pre-stored the adaptive bit precisions and the adaptive bit strings to the encoding unit 130. Moreover, according to the method of embodying the encoding apparatus 100, the pre-computed adaptive bit precision and adaptive bit string can be stored in the encoding unit 130 and the adaptive bit precision computing unit 120 can be omitted in the encoding apparatus 100.

The encoding unit 130 encodes a symbol inputted from the input 110. For example, the encoding unit 130 receives a symbol formed per each field from the input unit 110. The encoding unit 130 computes a bit precision of a pertinent field by using the symbol of the field. The method of computing the bit precision has been described with reference to the table 1. Then, the encoding unit 130 outputs a signal requesting an adaptive bit precision and an adaptive bit string of a target symbol (i.e. a symbol that is currently being encoded) to the adaptive bit precision computing unit 120. The encoding unit 130 receives an adaptive bit precision and an adaptive bit string from the adaptive bit precision computing unit 120 and determines whether the adaptive bit precision is identical to a bit precision of a field including the pertinent symbol. Next, the encoding unit 130 inserts a bit indicating that the adaptive bit precision is identical to the bit precision of the field including the target symbol into a bitstream. If the adaptive bit precision is identical to the bit precision, the encoding unit 130 does not insert the adaptive bit precision into the bitstream but inserts the encoded adaptive bit string into the bit stream. On the other hand, if the adaptive bit precision is not identical to the bit precision, the encoding unit 130 inserts the adaptive bit precision for the target symbol into the bitstream. After that, the encoding unit 130 encodes the target symbol by using the adaptive bit precision.

Below described is an embodiment of the present invention that the encoding apparatus 100 encodes successive symbols {3, 7, 5, 2} by using an adaptive bit precision.

The encoding unit 130 receives the successive symbols {3, 7, 5, 2} from the input unit 110. The encoding unit 130 computes bit precisions for the successive symbols {3, 7, 5, 2}. The following table 6 shows the bit number of an encoded bit string when using a plurality of bit precisions with reference to the table 1.

TABLE 3

| Bit precision | Encoded bit string | Bit number of encoded bit string |
|---|---|---|
| 1 | 100010000000100000100 | 21 |
| 2 | 1100111101111010 | 16 |
| 3 | 011111000101010 | 15 |
| 4 | 0011011101010001 | 16 |
| 5 | 00011001110010100001 | 20 |

The encoding unit 130, as shown in the table 3, determines the bit precision 3, which has the smallest bit number of the encoded bit string as the bit precision of the received symbols {3, 7, 5, 2}. At this time, although the table 6 shows the bit precisions 1 through 5, it shall be evident to any person of ordinary skill in the art that the range of the bit precision considered according to the method of computing the bit precision can be varied.

The predicting unit 130 inserts the determined bit precision into the bitstream. Then, the predicting unit 130 outputs a signal requesting an adaptive bit precision and an adaptive bit string of the symbol 3 to the adaptive bit precision computing unit 120. The adaptive bit precision computing unit 120 outputs the adaptive bit precision "3" and the adaptive bit string "00" of the symbol 3 to the encoding unit 130 according to the requesting signal. Then, the encoding unit 130 checks whether the adaptive bit precision 3 is identical to the bit precision 3. Since the two values are identical, the encoding unit 130 inserts "0" into the bitstream. "0" inserted into the bitstream indicates an adaptive bit precision of a symbol to be encoded is identical to a bit precision. In other words, the encoding unit 130 inserts "0" into the bitstream in order to inform a decoder that the encoding is performed by using the bit precision inserted into the bitstream in the aforementioned operations as an adaptive bit precision. Accordingly, the encoding unit 130 can save two bits by inserting "0" of 1 bit instead of 3 bits of the adaptive bit precision (at this time, it is assumed that the adaptive bit precision is represented by using 3 bits) into the bitstream. After that, the encoding unit 130 encodes the symbol 3 by using the adaptive bit precision 3. Since the method of performing the encoding by using the adaptive bit precision has been described with reference to the table 2, the pertinent description will be omitted.

Then, the predicting unit 130 outputs a signal requesting an adaptive bit precision and an adaptive bit string of the symbol 7 to the adaptive bit precision computing unit 120. The adaptive bit precision computing unit 120 outputs the adaptive bit precision "4" and the adaptive bit string "000" of the symbol 7 to the encoding unit 130 according to the requesting signal. Then, the encoding unit 130 recognizes that the adaptive bit precision 4 is different from the bit precision 3. The encoding unit 130 inserts "1" into the bitstream to inform that the adaptive bit precision 4 is different from the bit precision 3. After that, the encoding unit 130 inserts the adaptive bit precision 4 into the bitstream. The encoding unit 130 encodes the symbol 7 by using the adaptive bit precision 4.

Then, the encoding unit 130 encodes the symbols 5 and 2 like the aforementioned symbols 3 and 7.

Figure 2:
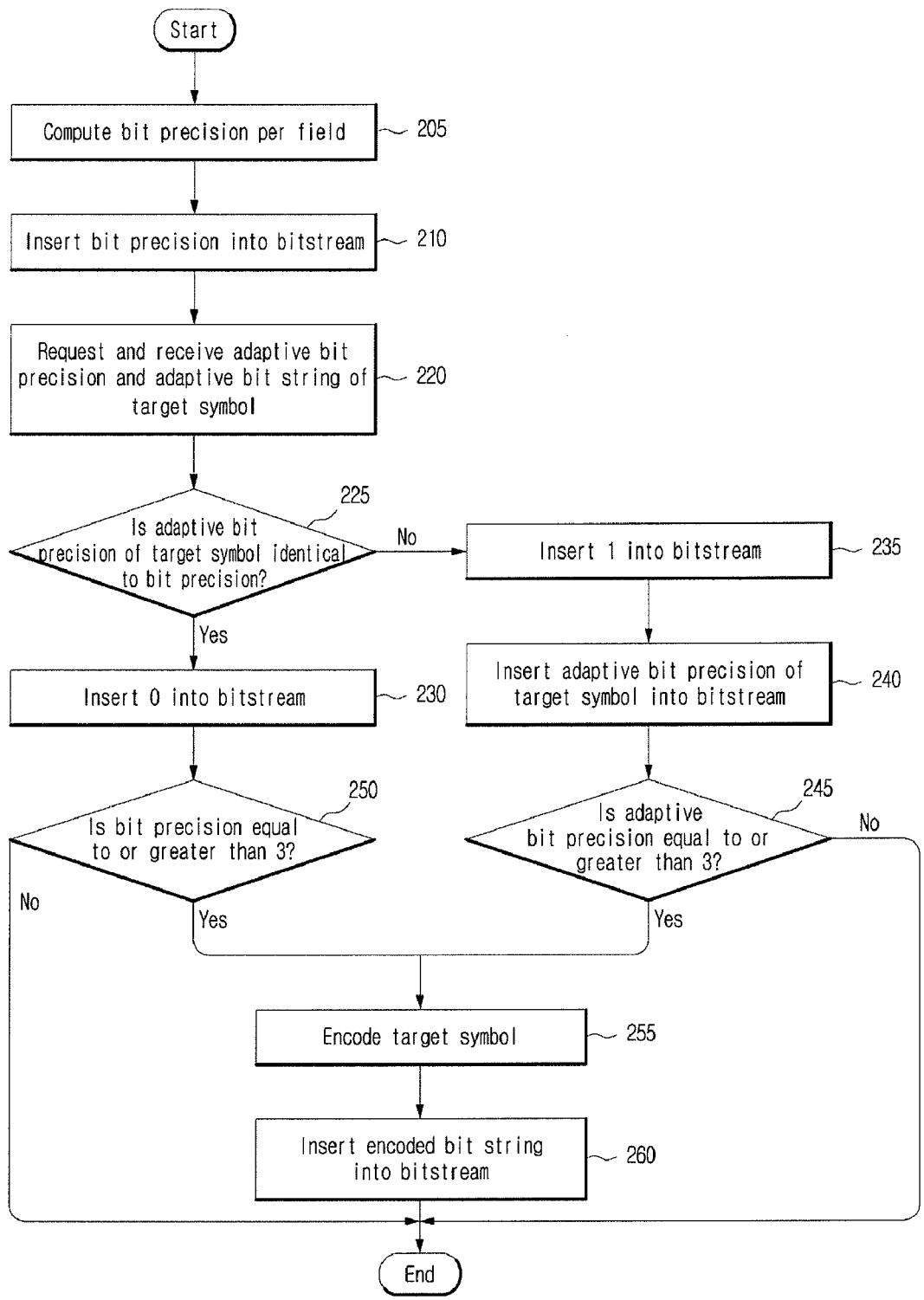
FIG. 2 is a flow chart showing an encoding operation using an adaptive bit precision in accordance with an embodiment of the present invention.

FIG. 2 is a flow chart showing an encoding operation using an adaptive bit precision in accordance with an embodiment of the present invention.

Referring to FIG. 2, the encoding unit 130 computes a bit precision per each field in a step represented by 205. At this time, the fields, into which input data is divided in predetermined units, can be at least one of a pixel value, mcbpc, cbpy, mv (motion vector)-x, my-y, DCT-luma and DCT-chroma.

Since the method of computing a bit precision has been described with reference to the table 1, the pertinent detailed description will be omitted.

In a step represented by 210, the encoding unit 130 inserts the bit precision computed per each field into bitstream.

In a step represented by 220, the encoding unit 130 requests an adaptive bit precision and an adaptive bit string of a target symbol from the adaptive bit precision computing unit 120 and receives the corresponding adaptive bit precision and adaptive bit string.

In a step represented by 225, the encoding unit 130 compares the adaptive bit precision of the target symbol with a bit precision to check whether the adaptive bit precision of the target symbol is identical to the bit precision.

If the adaptive bit precision of the target symbol is identical to the bit precision, the encoding unit 130 inserts "0" into a bitstream in a step represented by 230. Then, the encoding unit 130 checks whether the bit precision is identical to or larger than 3 in a step represented by 250. If the bit precision is identical to or larger than 3, the encoding unit 130 encodes a target symbol in a step represented by 255. After that, the encoding unit 130 inserts the encoded adaptive bit string into the bitstream. If the bit precision is smaller than 3, the encoding unit 130 ends the encoding operation of the pertinent symbol.

If the adaptive bit precision of the target symbol is identical to the bit precision, the encoding unit 130 inserts "1" into the bitstream in a step represented by 235.

Then, the encoding unit 130 inserts the adaptive bit precision of the target symbol in a step represented by 240.

The encoding unit 130 checks whether the adaptive bit precision is equal to or larger than 3 in a step represented by 245.

If the adaptive bit precision is smaller than 3, the encoding unit 130 ends the encoding operation of the pertinent symbol.

If the adaptive bit precision is equal to or larger than 3, the encoding unit 130 encodes the target symbol by using the adaptive bit precision in a step represented by 18555. In other words, the encoding unit 130 encodes the symbol as the adaptive bit string corresponding to the symbol among the adaptive bit strings inputted in the step represented by 220. For example, if it is assumed that the symbol 3 is to be encoded, the encoding unit 130 encodes the symbol as the adaptive bit string of 00 corresponding to the symbol 3 inputted in the step represented by 220.

Then, the encoding unit 130 inserts the encoded adaptive bit string into the bitstream. As a result, the encoding unit 130 encodes the symbol 3 and inserts "000" into the bitstream in consideration of inserting "0" in the step represented by 230. Of course, the aforementioned example has been described based on the assumption that the adaptive bit precision of the symbol is identical to a temporary adaptive bit precision. If the adaptive bit precision of the symbol is not equal to the temporary adaptive bit precision, the encoding unit 130 inserts an adaptive bit string "101100" (i.e. 1 in the step represented by 235, 011 in the step represented by 245 and 00 in the step represented by 255).

Even though the method of encoding one symbol has been described above for clear description of the present invention, the encoding unit 130 can repeatedly perform the steps represented by 220 through 260 until all symbols of the pertinent field are encoded. The bitstream, outputted through the aforementioned encoding operation must undergo a corresponding decoding operation in order to be converted to data capable of being used by a user. Hereinafter, a decoding apparatus that can decode data encoded by using the foresaid operation will be described with FIG. 3.

Figure 3:
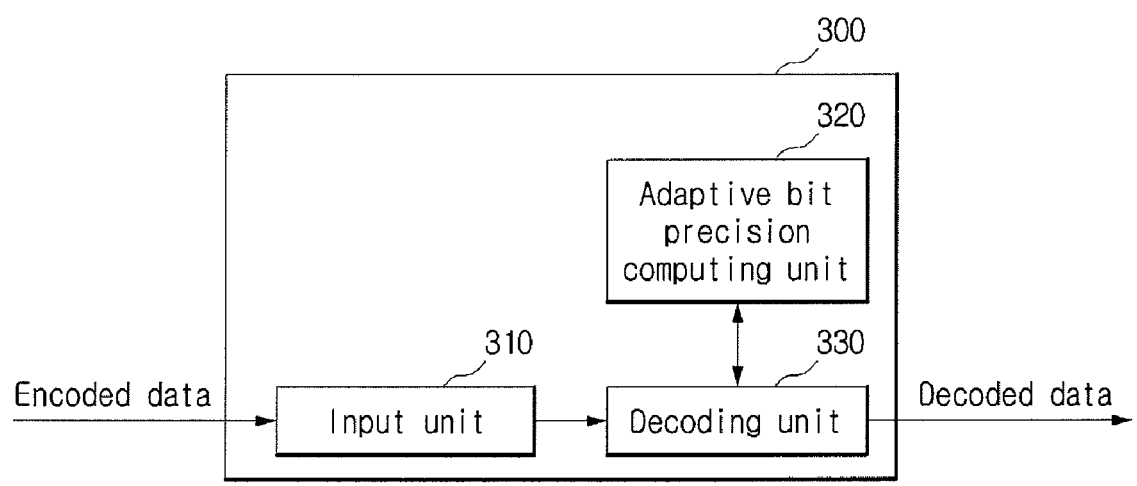
FIG. 3 is a block diagram showing a decoding apparatus using an adaptive bit precision in accordance with an embodiment.

FIG. 3 is a block diagram showing a decoding apparatus using an adaptive bit precision in accordance with an embodiment.

Referring to FIG. 3, the decoding apparatus 300 includes an input unit 310, an adaptive bit precision extracting unit 320 and a decoding unit 330.

The input unit 310 receives data encoded by using an adaptive bit precision from an outside device. Then, the input unit 310 parses the received encoded data per each field and output the parsed data to the decoding unit 330. The field can be at least one of a pixel value, mcbpc, cbpy, mv (motion vector)-x, my-y, DCT-luma and DCT-chroma.

The adaptive bit precision extracting unit 320 receives a signal requesting a symbol corresponding to an encoded adaptive bit stream from decoding unit 330. The adaptive bit precision extracting unit 320 computes the symbol corresponding to the encoded adaptive bit string and outputs the computed symbol to the decoding unit 330. The method of computing the adaptive bit precision and the adaptive bit string has been described by using the table 2. Accordingly, the pertinent detailed described will be omitted. Alternatively, the adaptive bit precision extracting unit 320 can store a pre-computed adaptive bit precision, adaptive bit string and symbol instead of computing the symbol corresponding to the encoded adaptive bit string. In other words, if the signal requesting the symbol corresponding to the encoded adaptive bit string of the decoding unit 330 is inputted, the adaptive bit precision extracting unit 320 can search a list of the pre-stored adaptive bit precision, adaptive bit string and symbol and output the symbol corresponding to the pertinent adaptive bit string to the decoding unit 330. Moreover, according to the embodying method of the decoding apparatus 300, the list of the pre-stored adaptive bit precision, adaptive bit string and symbol can be stored in the decoding unit 330, and the adaptive bit precision extracting unit 320 can be omitted in the decoding apparatus 300.

The decoding unit 330 receives the data parsed per field from the input unit 310. The decoding unit 330 decodes the parsed data per each field by using the adaptive bit precision. For example, the decoding unit 330 extracts the adaptive bit precision from the parsed data. Then, the decoding unit 330 extracts the encoded adaptive bit string from the data parsed according to the adaptive bit precision. For example, if the adaptive bit precision is assumed to be 3, the decoding unit 330 extracts 2 bits from the parsed data. At this time, it shall be obvious that the decoding unit successively extracts each bit from the parsed data. After that, the decoding unit 330 outputs a signal requesting a symbol corresponding to the parsed adaptive bit string to the adaptive bit precision extracting unit 320. Then, the decoding unit 330 receives the symbol (i.e. decoded data) corresponding to the pertinent adaptive bit string from adaptive bit precision extracting unit 320 and outputs the symbol to an outside device.

FIG. 4 is a flow chart showing a decoding operation using an adaptive bit precision in accordance with an embodiment of the present invention.

Referring to FIG. 4, the decoding unit 330 extracts a bit precision from encoded data in a step represented by 405.

In a step represented by 410, the decoding unit 330 extracts 1 bit from the encoded data.

In a step represented by 415, the decoding unit 2939 checks whether the 1 bit extracted in the step represented by 410 is 0.

If the 1 bit extracted in the step represented by 410 is not 0, the decoding unit 330 extracts an adaptive bit precision from the encoded data in a step represented by 420.

In a step represented by 425, the decoding unit 330 checks whether the adaptive bit precision extracted in the step represented by 420 is equal to or larger than 3.

If the adaptive bit precision extracted in the step represented by 420 is equal to or larger than 3, the decoding unit 330 decodes a pertinent symbol by using the adaptive bit precision in a step represented by 440.

If the adaptive bit precision is smaller than 3, however, the decoding of the pertinent symbol is ended.

If the 1 bit extracted in the step represented by 410 is 0, the decoding unit 330 checks whether the bit precision value is equal to or larger than 3 in a step represented by 430. If the bit precision value is equal to or larger than 3, decoding unit 330 decodes a pertinent symbol by using the adaptive bit precision by 435. If the bit precision is smaller than 3, however, the decoding of the pertinent symbol is ended.

The aforementioned decoding operation decodes an adaptive bit stream corresponding to one symbol. The decoding unit 330 can repeatedly perform the steps represented by 410 through 440 until all adaptive bit strings of the encoded data are decoded.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

INDUSTRIAL APPLICABILITY

The present invention can be applied to a video codec.

The invention claimed is:

1. An encoding apparatus, comprising:
an adaptive bit precision computing unit, configured to compute an adaptive bit precision and an adaptive bit string of a symbol; and
an encoding unit, configured to compute a bit precision per field and to insert the adaptive bit string and any one of the bit precision and the adaptive bit precision, according to whether the bit precision is identical to the adaptive bit precision, into a bitstream,
wherein the encoding unit further inserts a bit indicating whether the adaptive bit precision is identical to the adaptive bit string into the bitstream.

2. The apparatus of claim 1, wherein the adaptive bit string refers to a bit string, as which is a symbol is encoded by using the adaptive bit precision, the adaptive bit precision of the symbol having a value of 3 or more,
the adaptive bit precision refers to a bit indicating a length of the adaptive bit string,
a length of the adaptive bit string refers to a value obtained by subtracting 1 from a value of the adaptive bit precision, and
the bit precision refers to a bit indicating a length of a unit bit string for encoding the symbols.

3. The apparatus of claim 2, wherein the adaptive bit precision refers to a bit indicating a length of a unit bit string having optimized encoding efficiency corresponding to the symbol among lengths of the unit bit string.

4. An encoding method by an apparatus having at least one processor, the method using an adaptive bit precision, the method comprising:
computing, by the at least one processor, a bit precision per field and inserting the bit precision into a bitstream;
computing, by the at least one processor, an adaptive bit precision of a symbol;

computing, by the at least one processor, an adaptive bit string of the symbol by using the adaptive bit precision;

inserting, by the at least one processor, a bit indicating whether the bit precision is identical to the adaptive bit precision into the bitstream; and inserting, by the at least one processor, at least one of the adaptive bit precision and the adaptive bit string, according to whether the bit precision is identical to the adaptive bit precision, into the bitstream.

5. The method of claim 4, wherein the adaptive bit string refers to a bit string, as which is a symbol is encoded by using the adaptive bit precision, the adaptive bit precision of the symbol having a value of 3 or more, the adaptive bit precision refers to a bit indicating a length of the adaptive bit string, a length of the adaptive bit string refers to a value obtained by subtracting 1 from a value of the adaptive bit precision, and the bit precision refers to a bit indicating a length of a unit bit string for encoding the symbols.

6. The method of claim 4, wherein the adaptive bit precision refers to a bit indicating a length of a unit bit string having optimized encoding efficiency corresponding to the symbol among lengths of the unit bit string.

7. A decoding apparatus using an adaptive bit precision, comprising:

an adaptive bit precision extracting unit, configured to extract at least one of an adaptive bit precision and an adaptive bit string from a bitstream; and a decoding unit, configured to extract a bit precision from the bitstream and to decode the adaptive bit string as a symbol by using any one of the bit precision and the adaptive bit precision according to whether the bit precision is identical to the adaptive bit precision, wherein the adaptive bit precision extracting unit determines whether to extract the adaptive bit precision according to whether the bit precision is identical to the adaptive bit precision.

8. The decoding apparatus of claim 7, wherein the adaptive bit string refers to a bit string, as which is a symbol is encoded by using the adaptive bit precision, the adaptive bit precision of the symbol having a value of 3 or more, the adaptive bit precision refers to a bit indicating a length of the adaptive bit string, a length of the adaptive bit string refers to a value obtained by subtracting 1 from a value of the adaptive bit precision, and the bit precision refers to a bit indicating a length of a unit bit string for encoding the symbols.

9. The decoding apparatus of claim 8, wherein the adaptive bit precision refers to a bit indicating a length of a unit bit string having optimized encoding efficiency corresponding to the symbol among lengths of the unit bit string.

10. The decoding apparatus of claim 7, wherein, if the bit precision is identical to the adaptive bit precision, the adaptive bit precision extracting unit extracts the adaptive bit string from the bitstream, and if the bit precision is not identical to the adaptive bit precision, the adaptive bit precision extracting unit extracts the adaptive bit precision and the adaptive bit string from the bitstream.

11. The decoding apparatus of claim 7, wherein, if the bit precision is identical to the adaptive bit precision, the decoding unit decodes the adaptive bit string as the symbol by using the bit precision, and if the bit precision is not identical to the adaptive bit precision, the decoding unit decodes the adaptive bit string as the symbol by using the adaptive bit precision.

12. A decoding method by an apparatus having at least one processor, the method using an adaptive bit precision, the method comprising:

extracting, by the at least one processor, a bit precision from a bitstream;

extracting, by the at least one processor, at least one of an adaptive bit precision and an adaptive bit string from the bitstream according to whether the bit precision is identical to the adaptive bit string; and decoding, by the at least one processor, the adaptive bit string as a symbol by using any one of the bit precision and the adaptive bit precision according to whether the bit precision is identical to the adaptive bit precision.

13. The decoding method of claim 12, wherein the adaptive bit string refers to a bit string, as which is a symbol is encoded by using the adaptive bit precision, the adaptive bit precision of the symbol having a value of 3 or more, the adaptive bit precision refers to a bit indicating a length of the adaptive bit string, a length of the adaptive bit string refers to a value obtained by subtracting 1 from a value of the adaptive bit precision, and the bit precision refers to a bit indicating a length of a unit bit string for encoding the symbols.

14. The decoding method of claim 12, wherein the extracting at least one of the adaptive bit precision and the adaptive bit string from the bitstream according to whether the bit precision is identical to the adaptive bit string comprises checking whether the bit precision is identical to the adaptive bit precision by extracting a bit indicating whether the bit precision is identical to the adaptive bit precision;

extracting the adaptive bit string from the bitstream if the bit precision is identical to the adaptive bit precision; and extracting the adaptive bit precision and the adaptive bit sting from the bitstream if the bit precision is not identical to the adaptive bit precision.

15. The decoding method of claim 12, wherein the decoding the adaptive bit string as the symbol by using any one of the bit precision and the adaptive bit precision according to whether the bit precision is identical to the adaptive bit precision comprises decoding the adaptive bit string as the symbol by using the bit precision if the bit precision is identical to the adaptive bit precision; and decoding the adaptive bit string as the symbol by using the adaptive bit precision if the bit precision is not identical to the adaptive bit precision.

* * * * *